United States Patent [19]
Hassler

[11] Patent Number: 5,896,173
[45] Date of Patent: Apr. 20, 1999

[54] IMAGE DETECTOR WITH SELECTIVE READOUT OF PIXELS IN GROUPS OR INDIVIDUALLY

[75] Inventor: Dietrich Hassler, Uttenreuth, Germany

[73] Assignee: Siemens Aktiengesellschaft, Munich, Germany

[21] Appl. No.: 08/643,889

[22] Filed: May 7, 1996

[30] Foreign Application Priority Data

Jul. 7, 1995 [DE] Germany .............. 195 24 857

[51] Int. Cl.$^6$ .............. H04N 5/30; H04N 3/14
[52] U.S. Cl. .............. 348/162; 348/302
[58] Field of Search .............. 348/162, 302, 348/304, 309

[56] References Cited

U.S. PATENT DOCUMENTS

| | | | |
|---|---|---|---|
| 4,179,100 | 12/1979 | Sashin et al. | |
| 4,382,187 | 5/1983 | Fraleux et al. | 350/578 |
| 5,193,018 | 3/1993 | Wu | 359/59 |
| 5,235,174 | 8/1993 | Ikeda et al. | 250/208.1 |
| 5,262,871 | 11/1993 | Wilder et al. | 358/213.11 |
| 5,420,452 | 5/1995 | Tran et al. | 257/428 |
| 5,721,422 | 2/1998 | Bird | 250/208.1 |
| 5,729,285 | 3/1998 | Peterson et al. | 348/162 |

FOREIGN PATENT DOCUMENTS 41 23 203  10/1992  Germany.

*Primary Examiner*—Wendy Garber
*Assistant Examiner*—Jacqueline Wilson
*Attorney, Agent, or Firm*—Hill & Simpson

[57] ABSTRACT

An image detector for X-ray technology enables different image resolutions in a simple way. In an a-Si:H detector matrix, several pixels can be fixed via a row lead and a column lead, and these pixels can be interrogated together or, by the use of voltage impulses of different levels or polarity, can be interrogated separately.

6 Claims, 6 Drawing Sheets

IMAGE DETECTOR WITH SELECTIVE READOUT OF PIXELS IN GROUPS OR INDIVIDUALLY

BACKGROUND OF THE INVENTION

1. Field of the Invention

The present invention is directed to an image detector suitable for generating electrical signals corresponding to a light image incident on the detector.

2. Description of the Prior Art

In systems for generating X-ray images, in practice a spatial resolution matched to the particular diagnostic task at hand is required. Thus, for a survey exposure a low resolution is sufficient, while for details a high resolution is often required. For the production of individual exposures, it is known to use films, film/foil combinations or storage foils having different resolutions. For fluoroscopy, there are X-ray image amplifiers whose image enlargement, as well as the resolution connected therewith, is selectable.

SUMMARY OF THE INVENTION

An object of the present invention is to provide an image detector, in particular for use in X-ray technology, wherein image generation with high and low spatial resolution is possible in a particularly simple fashion.

The above object is achieved in accordance with the principles of the present invention in an image detector having a matrix of the detector elements, the detector elements each representing a pixel, and being interrogated by means of row and column leads. At least one group of pixels, such as four pixels, can be fixed by one auxiliary row lead and one auxiliary column lead, so that the pixels in this group can be interrogated together or can be interrogated separately. For separate interrogation for the pixels in the group, voltage pulses having respectively different voltage characteristics are supplied to the pixels, such as voltage pulses of different levels (amplitudes) or polarity.

In the inventive image detector, images having low spatial resolution can be generated quickly, and those having high spatial resolution can be generated slowly. In the invention, a fine matrix (closely spaced pixels) forms the basis for the highest desired resolution, at least in one region, and the read-out can be organized such that several pixels can be read out either superimposed or separately.

DESCRIPTION OF THE PREFERRED EMBODIMENTS

Figure 1:
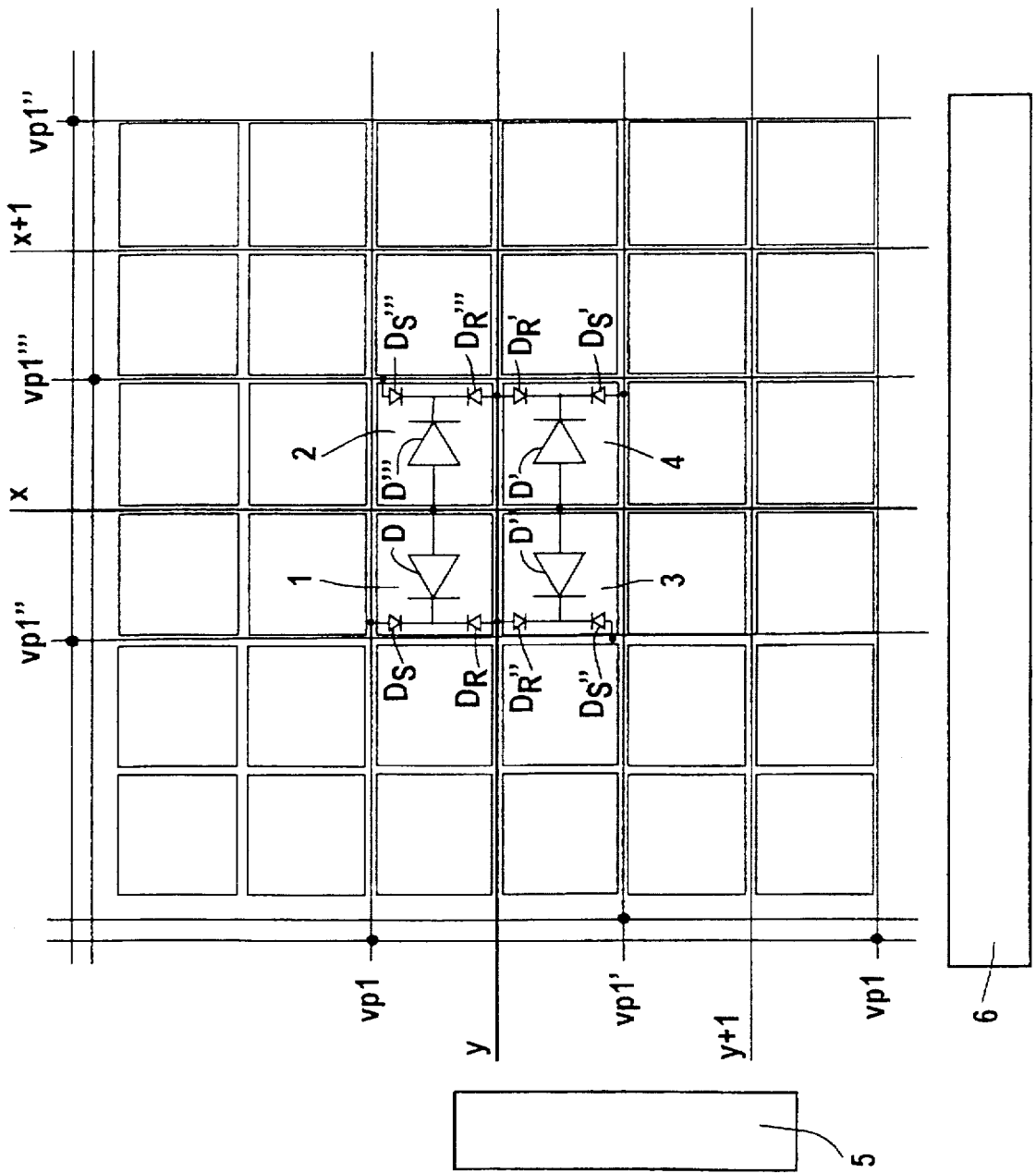
FIG. 1 shows the arrangement of the pixels and the electrical connections in an image detector according to the invention.

FIG. 1 shows an image detector having a matrix of detector elements, which can be interrogated by means of row and column leads. The row leads are designated y, y+1, etc., and the column leads are designated x, x+1, etc. The image detector is preferably constructed with an a-Si:H detector matrix.

As shown in FIG. 1, first a matrix point is defined by the selection of the row y and the column x. The four nearest-lying pixels are thereby fixed. Any number of such pixel quadruplets can be provided within the matrix. In order to maintain the resolution that is connected with the smallest pixel spacing, it must be possible to interrogate the four pixels grouped around this point separately. Distinguishing among these four pixels is accomplished with leads vp1, vp1', vp1", vp1''', which are common to all the quadruplets of pixels, so that only four additional leads from outside the matrix are required. The external electronic equipment such as shift registers 5 and 6, is designed for low resolution (smaller matrix), i.e. only the conventional rows and columns are connected thereto.

The four pixels are respectively formed by photodiodes D, D', D", D''' and switching diodes $D_R$, $D_R'$, $D_R"$, $D_R'''$. In addition, each pixel contains a switching diode $D_S$, $D_S'$, $D_S"$, $D_S'''$, connected to one of the four additional leads. The circuit diagram is shown in an enlarged representation in FIG. 2.

Figure 2:
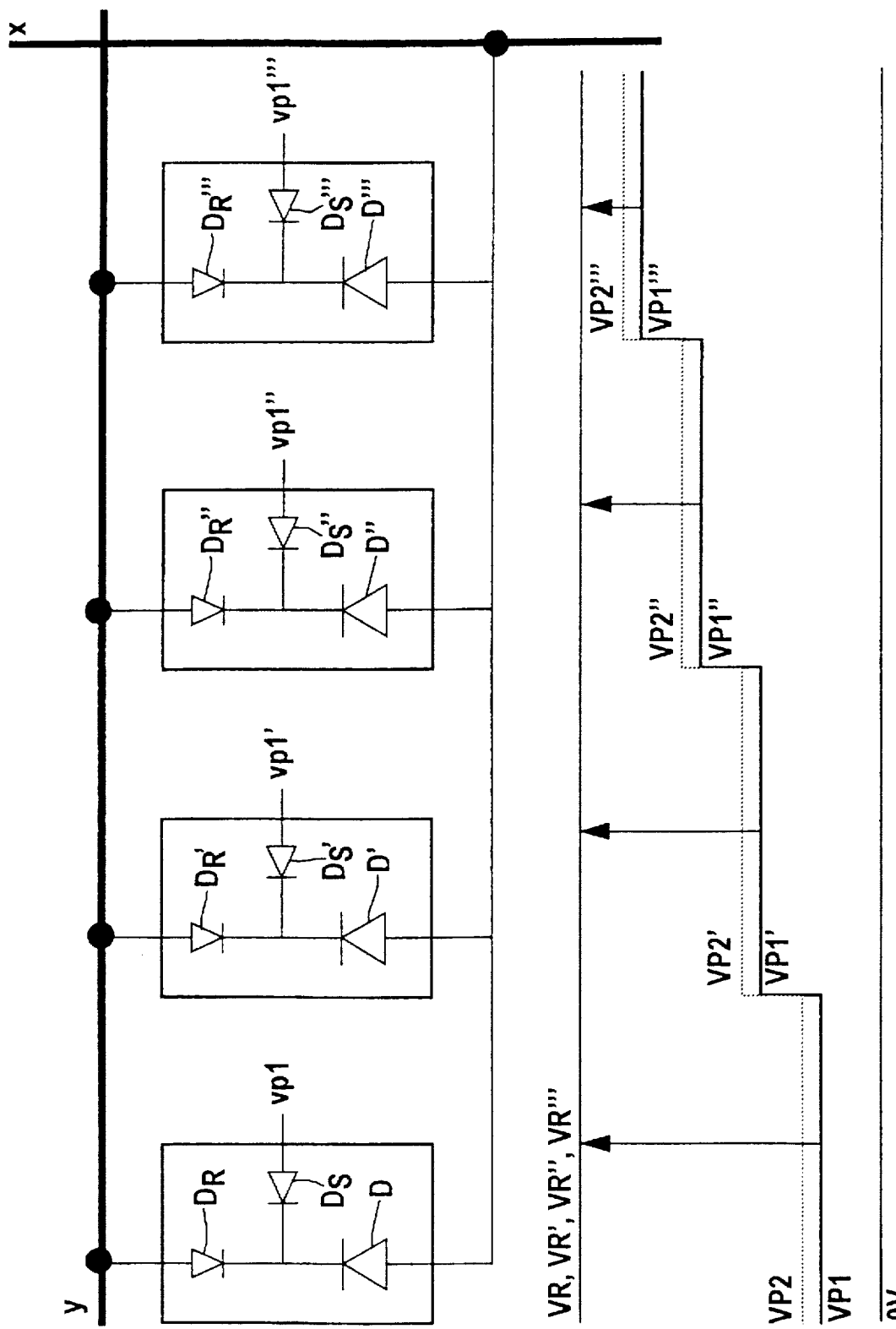
FIG. 2 is a circuit diagram for an image point having four subpixels in the image detector according to FIG. 1.

The different voltages at which the four pixels are operated in order to enable a separate read-out after a common, simultaneous exposure of all the pixels are symbolized under the circuit diagram in FIG. 2.

Figure 3:
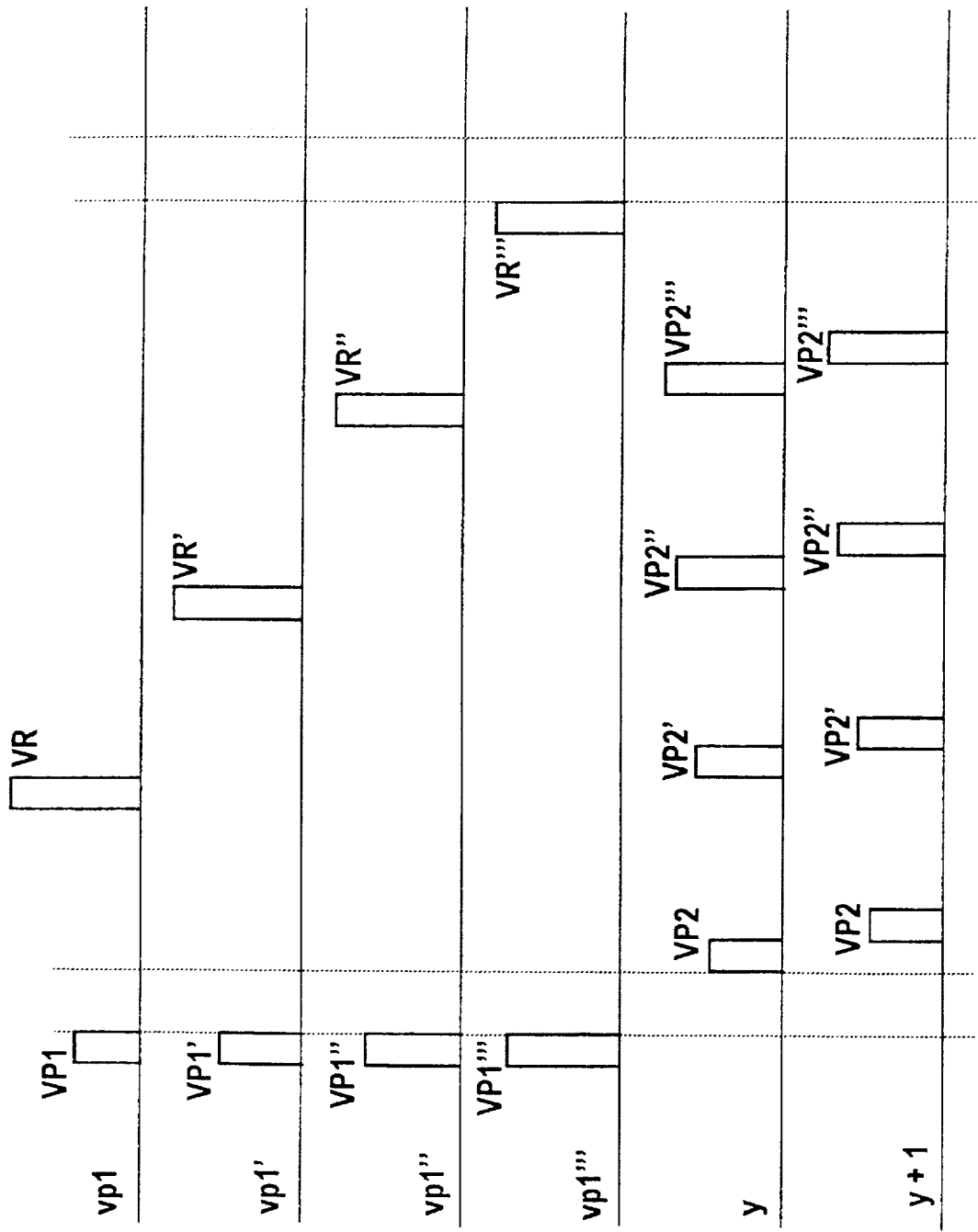
FIG. 3 is a pulse diagram for the explanation of FIGS. 1 and 2.

FIG. 3 shows the chronological voltage curve, i.e., the pulse sequence, for the four additional leads, representing, for all rows, the drive on row y and row y+1.

All four pixels are simultaneously set at different voltage levels by means of voltage pulses VP1, VP1', VP", VP'''. X-ray irradiation subsequently follows, common to all pixels of the detector. Subsequently all pixels having diodes D are read out, by applying a pulse VP2 sequentially to all rows, with VP2>VP1. Since other diodes (D', D", D''') were set at a voltage higher than VP2, they remain switched off, i.e., unaffected by the read-out process. For this purpose, the voltage levels must be sufficiently high. After read-out of the last row, all pixels that have now been read out are boosted to the voltage VR via leads vp1. Since VR is the highest voltage which occurs; the pixels thus loaded are no longer affected by subsequent smaller read-out pulses. Read-out of the rest of the pixels according to the same pattern subsequently follows. At the end of the entire process, or before the beginning of the next cycle, resetting takes place by loading with a light pulse. The last impulse VR''' would not be necessary, but is applied for reasons of symmetry.

Since all the information on each of the extra column leads is read out, the read-out period is four times as long as in a conventionally designed detector, however, this lengthened read-out time means a savings in hardware. Moreover, since the X-ray pulse is simultaneously effective for the whole detector, there is no danger of motion artifacts. An acceleration can be achieved in producing a zoom image if only a part of all the rows are addressed.

Operation at low resolution can take place unaltered as before, whereby the voltages VP1, VP1', VP1", VP1''' are at 0 V, and the diodes $D_S$, $D_S'$, $D_S"$, $D_S'''$ thus remain ineffective. The four pixels of a quadruplet are then operated in parallel.

Of course, the division of function of the diodes $D_S$, $D_R$ is also usable as in the case of high resolution: via leads vp1, vp1', vp1", vp1''', or, via diodes $D_S$, $D_S'$, $D_S"$, $D_S'''$, the pixels are set at equal voltages VP1=VP1'=VP1"=VP1''' and are read out via $D_R$, $D_R'$, $D_R"$, $D_R'''$ using VP2.

Figure 4:
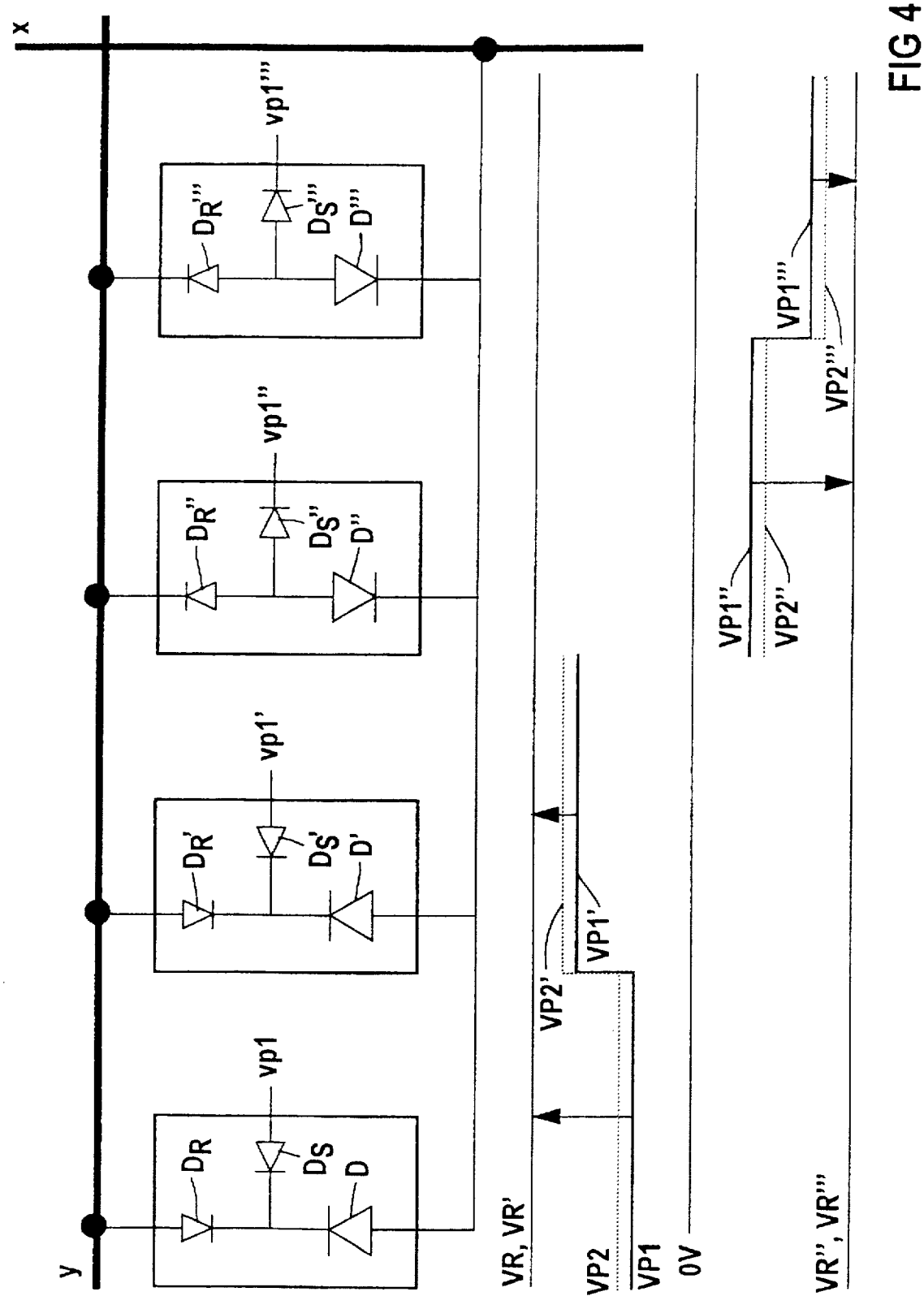
FIG. 4 is a circuit diagram for an image point having four sub-pixels, in a bipolar embodiment of the inventive image detector.
Figure 5:
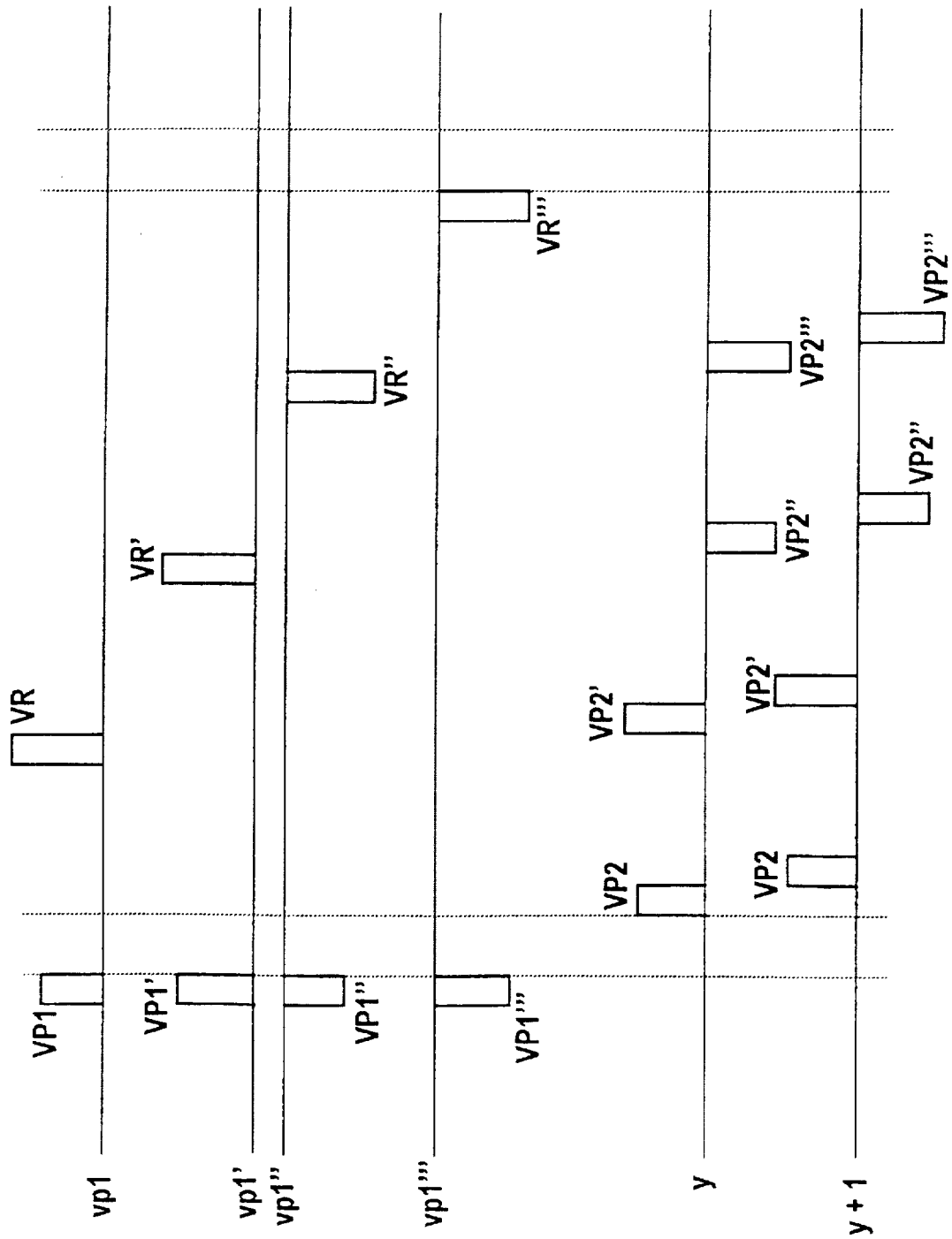
FIG. 5 is a pulse diagram for bipolar drive of the circuit of FIG. 4.

If the dynamic range given by VP1 is exhausted by the exposure, the load voltage of the photodiodes changes according to the exposure by a maximum of VP1. Since this drive range is supposed to be the same size for all the pixels, the VP levels in FIG. 2 must be equally high. The blocking voltage of the semiconductor technology must therefore reach values which are four times those employed for individual read-out. If this is a problem, the increased voltage requirement can be limited to the switching diodes $D_R$, $D_R'$, $D_R''$, $D_R'''$, and for the rest of the circuit the increase can be only a doubling, if a bipolar drive is used. FIG. 4 shows a circuit diagram of such an embodiment, with the allocated pulses being shown in FIG. 5. The basic principle is unaltered. The voltages are VP1=−VP1' and VP1"=−VP1'", as well as VP2=−VP2" and VP2'=−VP2'" and VR=VR'=−VR"=−VR'". The external electronic equipment must be converted to bipolar operation.

An intermediate step, requiring only double electric strength or only bipolar technology, is conceivable, in which e.g. only left/right pixel pairs of a quadruplet are distinguished by means of the voltage level of the voltage VP1, etc. This also means, however, that the full number of rows leading outward to the electronics must be maintained, but only one half of the number of columns.

Figure 6:
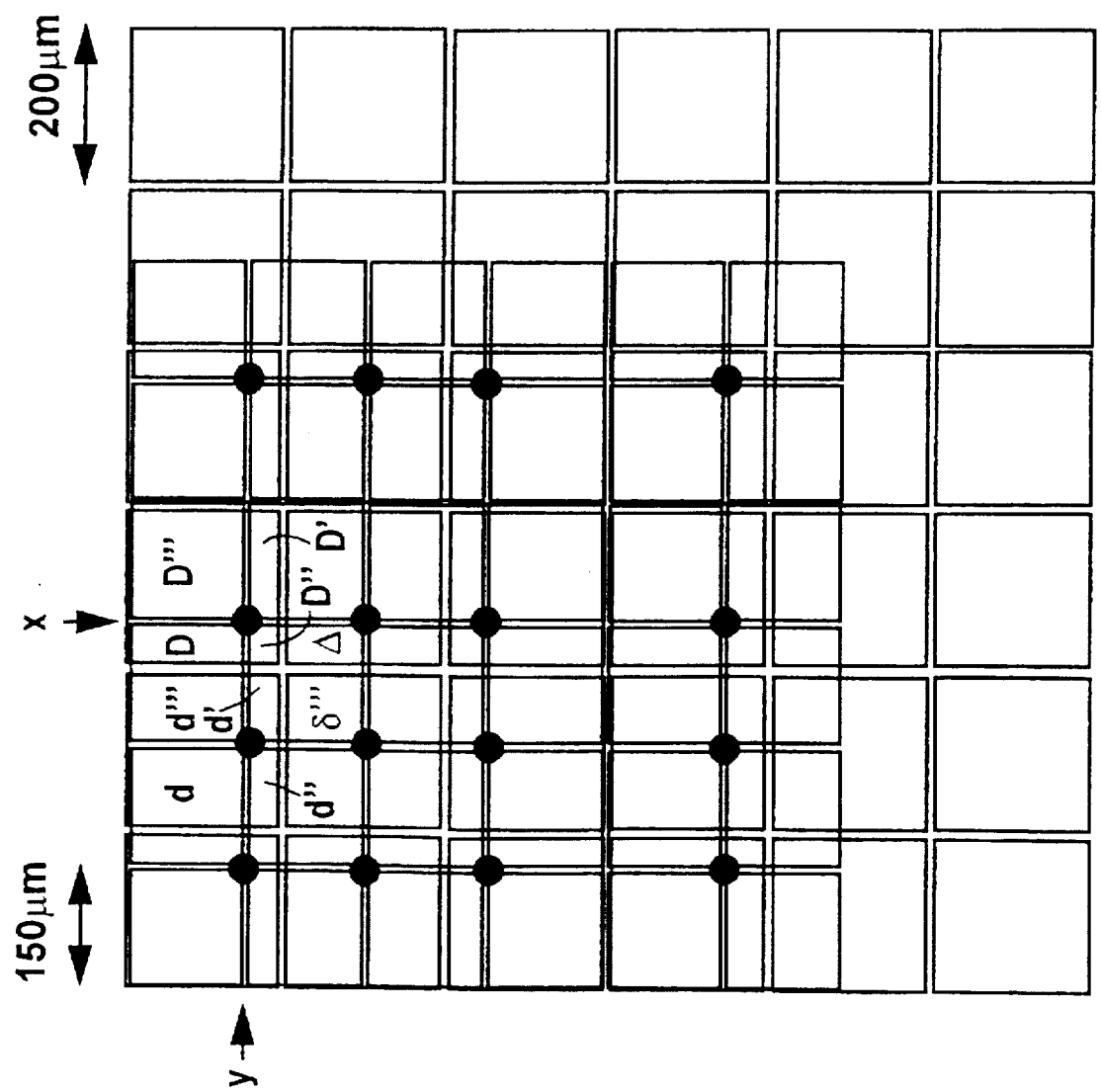
FIG. 6 shows an image detector according to the invention having an increase in resolution in the ratio 4:3.

FIG. 6 shows that another increased resolution, less than two, such as factor 4/3, can also be implemented.

In the example, rasters of 200 μm or 150 μm are superimposed. The points mark the points of intersection of the drive via rows and columns. The associated leads are not shown for clarity. The intermediately located leads vp1, vp1', vp1", vp1'" are likewise omitted.

In operation with 200 μm pixels, the pixels d, d', d", d'" and D, D', D", D'", etc., are driven in parallel fashion. Images having 150 μm sampling are read in the high-resolution mode as specified above, whereby the smaller pixels are differently composed. For example, the pixel at the upper left of row y, column x results from the sum of the data from d'" and D. For the pixel at the upper right, the value D'" is sufficient. For the pixel at the lower left, four values d', D", δ'", Δ are summed, whereby each two come from different rows. This type of sorting takes place by means of the operating computer program.

For completeness, it should also be noted that the above principle for distinguishing pixels on the basis of different voltage levels given a non-linear characteristic (switch) can also be used in detectors switched with TFTs (field effect transistors). The switching behavior is expressed in the input characteristic (output current dependent on the control voltage at the gate).

Although modifications and changes may be suggested by those skilled in the art, it is the intention of the inventors to embody within the patent warranted hereon all changes and modifications as reasonably and properly come within the scope of their contribution to the art.

I claim as my invention:

1. An image detector comprising:
   a matrix of detector elements, each detector element representing a pixel;
   a plurality of row leads and a plurality of column leads respectively connected to said detector elements for reading out said detector elements by row and column;
   at least one auxiliary row lead and at least one auxiliary column lead comprising, in combination, means for fixing a group of pixels for selectively interrogating all pixels in said group together or separately interrogating each pixel in said group.

2. An image detector as claimed in claim 1, wherein said at least one row lead and said at least one column lead comprise, in combination, a means for applying voltage pulses of respectively different levels to said pixels in said group for separately interrogating said pixels.

3. An image detector as claimed in claim 1, wherein said at least one row lead and said at least one column lead comprise, in combination, a means for applying voltage pulses of respectively different polarity to said pixels in said group for separately interrogating said pixels.

4. An image detector as claimed in claim 1, wherein said matrix comprises an a-Si:H detector matrix.

5. An image detector as claimed in claim 1, wherein said at least one auxiliary row lead and said at least one auxiliary column lead comprise, in combination, means for fixing a group of four pixels.

6. An image detector as claimed in claim 1, further comprising a plurality of circuit elements having non-linear characteristics, and respectively allocated to said pixels in said group, for distinguishing said pixels for separately interrogating said pixels.

* * * * *